United States Patent
Masuzaki et al.

(10) Patent No.: US 10,613,960 B2
(45) Date of Patent: Apr. 7, 2020

(54) INFORMATION PROCESSING APPARATUS AND INFORMATION PROCESSING METHOD

(71) Applicant: Mitsubishi Electric Corporation, Tokyo (JP)

(72) Inventors: Takahiko Masuzaki, Tokyo (JP); Takaaki Nakamura, Tokyo (JP); Osamu Nasu, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/463,398

(22) PCT Filed: Jul. 31, 2017

(86) PCT No.: PCT/JP2017/027706
§ 371 (c)(1),
(2) Date: May 23, 2019

(87) PCT Pub. No.: WO2019/026134
PCT Pub. Date: Feb. 7, 2019

(65) Prior Publication Data
US 2019/0310927 A1    Oct. 10, 2019

(51) Int. Cl.
*G06F 11/00* (2006.01)
*G06F 11/32* (2006.01)
(Continued)

(52) U.S. Cl.
CPC ............ *G06F 11/322* (2013.01); *G05B 23/00* (2013.01); *G06F 11/0751* (2013.01); *G06K 9/6218* (2013.01); *G06N 20/00* (2019.01)

(58) Field of Classification Search
CPC ... G06F 11/322; G06F 11/0751; G06N 20/00; G06K 9/6218
(Continued)

(56) References Cited

U.S. PATENT DOCUMENTS 5,301,364 A * 4/1994 Arens ................. H03G 3/3052
370/332
9,779,361 B2   10/2017 Jones et al.
(Continued)

FOREIGN PATENT DOCUMENTS

JP    2007-72752 A    3/2007
JP    2009-217555 A   9/2009
(Continued)

OTHER PUBLICATIONS

Wikipedia TDM page, retrieved from https://en.wikipedia.org/wiki/Time-division_multiplexing (Year: 2019).*
(Continued)

*Primary Examiner* — Yair Leibovich
(74) *Attorney, Agent, or Firm* — Xsensus, LLP

(57) ABSTRACT

An information processing apparatus includes a data acquisition unit to acquire input data that is time-series data; a sampling error upper limit calculation unit to calculate, when similar learning subsequences selected from among a plurality of learning subsequences extracted from learning data that is time-series data are integrated to generate a sample subsequence. The information processing apparatus further includes a sampling error upper limit using data taken from the input data, the sampling error upper limit being an upper limit on dissimilarity between the learning subsequences to be integrated; and a sample subsequence generation unit to generate the sample subsequence from the learning data using the sampling error upper limit.

15 Claims, 14 Drawing Sheets

(51) Int. Cl.
*G06N 20/00* (2019.01)
*G06F 11/07* (2006.01)
*G06K 9/62* (2006.01)
*G05B 23/00* (2006.01)

(58) Field of Classification Search
USPC .......................................................... 714/30
See application file for complete search history.

(56) References Cited

U.S. PATENT DOCUMENTS

| 10,223,069 | B2 | 3/2019 | Nakamura et al. | |
| 2016/0142898 | A1* | 5/2016 | Poitau | H04W 76/14 370/329 |
| 2016/0202164 | A1* | 7/2016 | Trainer | G01N 15/0211 |
| 2017/0317701 | A1* | 11/2017 | Demirtas | H04B 1/1027 |

FOREIGN PATENT DOCUMENTS

| JP | 2011-192097 A | 9/2011 |
| JP | 5178471 B2 | 4/2013 |
| JP | 2015-230727 A | 12/2015 |
| JP | 2017-16522 A | 1/2017 |
| WO | 2011/036809 A1 | 3/2011 |
| WO | 2016/117086 A1 | 7/2016 |

OTHER PUBLICATIONS

International Search Report dated Sep. 12, 2017 for PCT/JP2017/027706 filed on Jul. 31, 2017, 8 pages including English Translation of the International Search Report.
Decision to Grant a Patent received for Japanese Patent Application No. 2018-508255, dated May 23, 2018, 5 pages including English Translation.

* cited by examiner

INFORMATION PROCESSING APPARATUS AND INFORMATION PROCESSING METHOD

CROSS-REFERENCE TO RELATED APPLICATIONS

The present application is based on PCT filing PCT/JP2017/027706, filed Jul. 31, 2017, which is incorporated herein by reference.

FIELD

The present invention relates to an information processing apparatus and an information processing method for diagnosing time-series data using predetermined data.

BACKGROUND

A method of diagnosing diagnostic target data includes defining normal data as learning data in advance and diagnosing whether the diagnostic target data are normal on the basis of whether the learning data include a waveform similar to the waveform of the diagnostic target data. For example, sensor data acquired during normal operation of production equipment are used as learning data, and sensor data of the production equipment in operation are used as diagnostic target data, whereby an abnormality in the production equipment can be detected.

Whether the learning data include a waveform similar to the waveform of the diagnostic target data can be determined by using the dissimilarity between subsequences extracted from the learning data and the diagnostic target data. While sliding the range of extracting a subsequence from the learning data little by little, the dissimilarities between all the subsequences of the learning data and a subsequence extracted from the diagnostic target data are calculated, and the lowest dissimilarity is set as the dissimilarity of the subsequence extracted from the diagnostic target data. However, with this method, it is necessary to calculate dissimilarities for all the combinations of subsequences of the diagnostic target data and all the subsequences of the learning data, and thus it takes a long time to calculate dissimilarities due to the large calculation amount.

In contrast to the above method, the method described in Patent Literature 1 includes clustering the subsequences of learning data to generate a plurality of clusters in which the dissimilarities between subsequences are within a predetermined sampling error upper limit, and integrating the subsequences in each cluster to generate sample subsequences. By comparing the sample subsequences with the subsequences of the diagnostic target data, it is possible to reduce the calculation amount and shorten the time for dissimilarity calculation.

CITATION LIST

Patent Literature

Patent Literature 1: PCT Patent Application Laid-open No. 2016/117086

SUMMARY

Technical Problem

However, Patent Literature 1 does not describe in detail a method of calculating a sampling error upper limit, which is the upper limit on the dissimilarity between subsequences to be integrated. If the sampling error upper limit is too high, the accuracy of diagnosis of diagnostic target data is degraded. If the sampling error upper limit is too low, processing takes a long time due to the large calculation amount. This causes difficulty in generating appropriate sample subsequences while keeping a balance between diagnostic accuracy and processing time.

The present invention has been made in view of the above, and an object thereof is to obtain an information processing apparatus capable of easily generating appropriate sample subsequences.

Solution to Problem

In order to solve the above-described problems and achieve the object, an aspect of the present invention includes: a data acquisition unit to acquire input data that is time-series data; a sampling error upper limit calculation unit to calculate a sampling error upper limit using data taken from the input data; and a sample subsequence generation unit to generate the sample subsequence from the learning data using the sampling error upper limit. When similar learning subsequences selected from among a plurality of learning subsequences extracted from learning data are integrated to generate a sample subsequence, the sampling error upper limit is an upper limit on dissimilarity between the learning subsequences to be integrated.

Advantageous Effects of Invention

The information processing apparatus according to the present invention can achieve the effect of easily generating appropriate sample subsequences.

DESCRIPTION OF EMBODIMENTS

Hereinafter, an information processing apparatus and an information processing method according to embodiments of the present invention will be described in detail on the basis of the drawings. The present invention is not limited to the embodiments.

Embodiment

Figure 1:
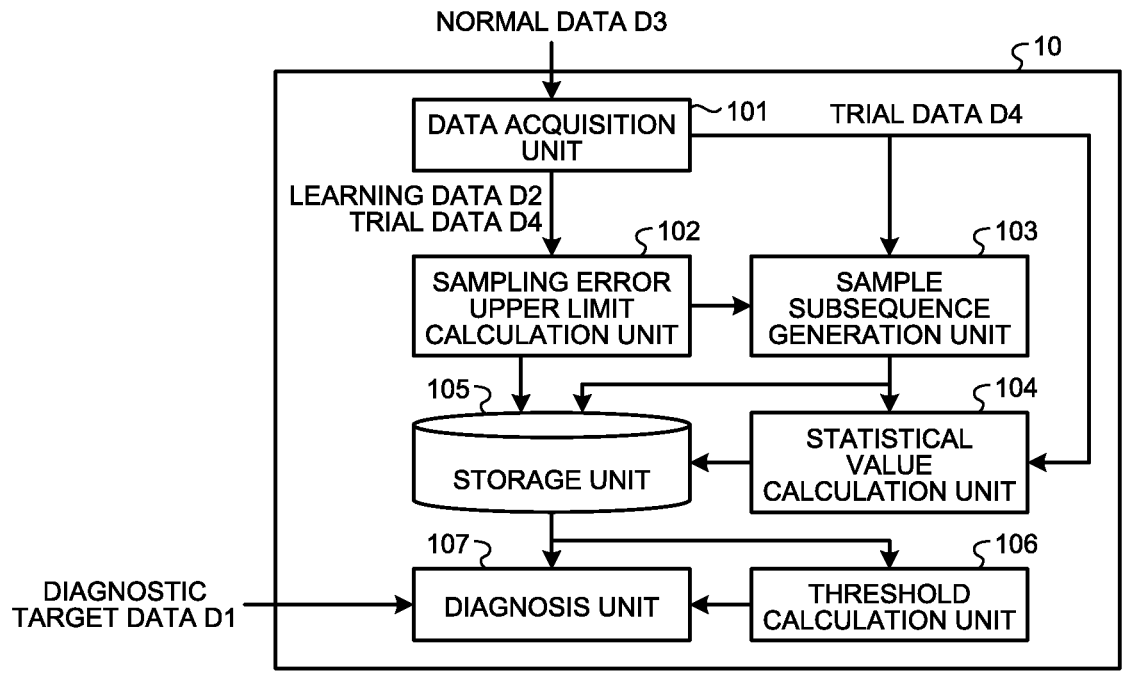
FIG. 1 is a diagram illustrating a configuration of an information processing apparatus according to an embodiment of the present invention.

FIG. 1 is a diagram illustrating a configuration of an information processing apparatus 10 according to an embodiment of the present invention. The information processing apparatus 10 includes a data acquisition unit 101, a sampling error upper limit calculation unit 102, a sample subsequence generation unit 103, a statistical value calculation unit 104, a storage unit 105, a threshold calculation unit 106, and a diagnosis unit 107.

Figure 2:
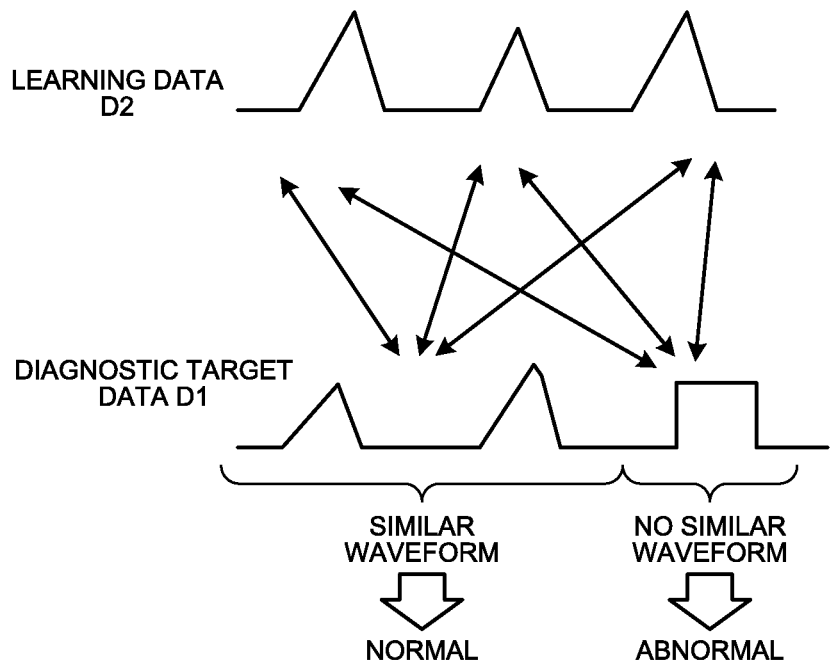
FIG. 2 is a diagram illustrating an outline of the diagnosis of diagnostic target data performed by the information processing apparatus illustrated in FIG. 1 using learning data.

The information processing apparatus 10 has a function of diagnosing diagnostic target data D1 on the basis of whether learning data D2 (described later) include a waveform similar to the waveform of the diagnostic target data D1. FIG. 2 is a diagram illustrating an outline of the diagnosis of the diagnostic target data D1 performed by the information processing apparatus 10 illustrated in FIG. 1 using the learning data D2. The diagnostic target data D1 are data to be diagnosed. The learning data D2 are defined as normal data in advance and used as criteria for the diagnosis. For example, the learning data D2 are time-series data such as sensor data. The diagnostic target data D1 are the same type of time-series data as the learning data D2. If the learning data D2 are temperature data, the diagnostic target data D1 are also temperature data. If the learning data D2 include a waveform similar to the waveform of the diagnostic target data D1, the information processing apparatus 10 determines that the diagnostic target data D1 are normal. If the learning data D2 do not include a waveform similar to the waveform of the diagnostic target data D1, the information processing apparatus 10 determines that the diagnostic target data D1 are abnormal.

Typically, abnormal production equipment outputs sensor data including a waveform different from any waveform of sensor data acquired during normal operation of the production equipment. In this case, the sensor data acquired during normal operation of the production equipment are used as the learning data D2, and the sensor data of the production equipment in operation are used as the diagnostic target data D1, whereby the abnormality of the production equipment can be detected. By sequentially repeating the process of obtaining sensor data from the production equipment in operation and the diagnosis process of using the acquired sensor data as the diagnostic target data D1, the information processing apparatus 10 can detect an abnormality in the production equipment in real time.

Figure 3:
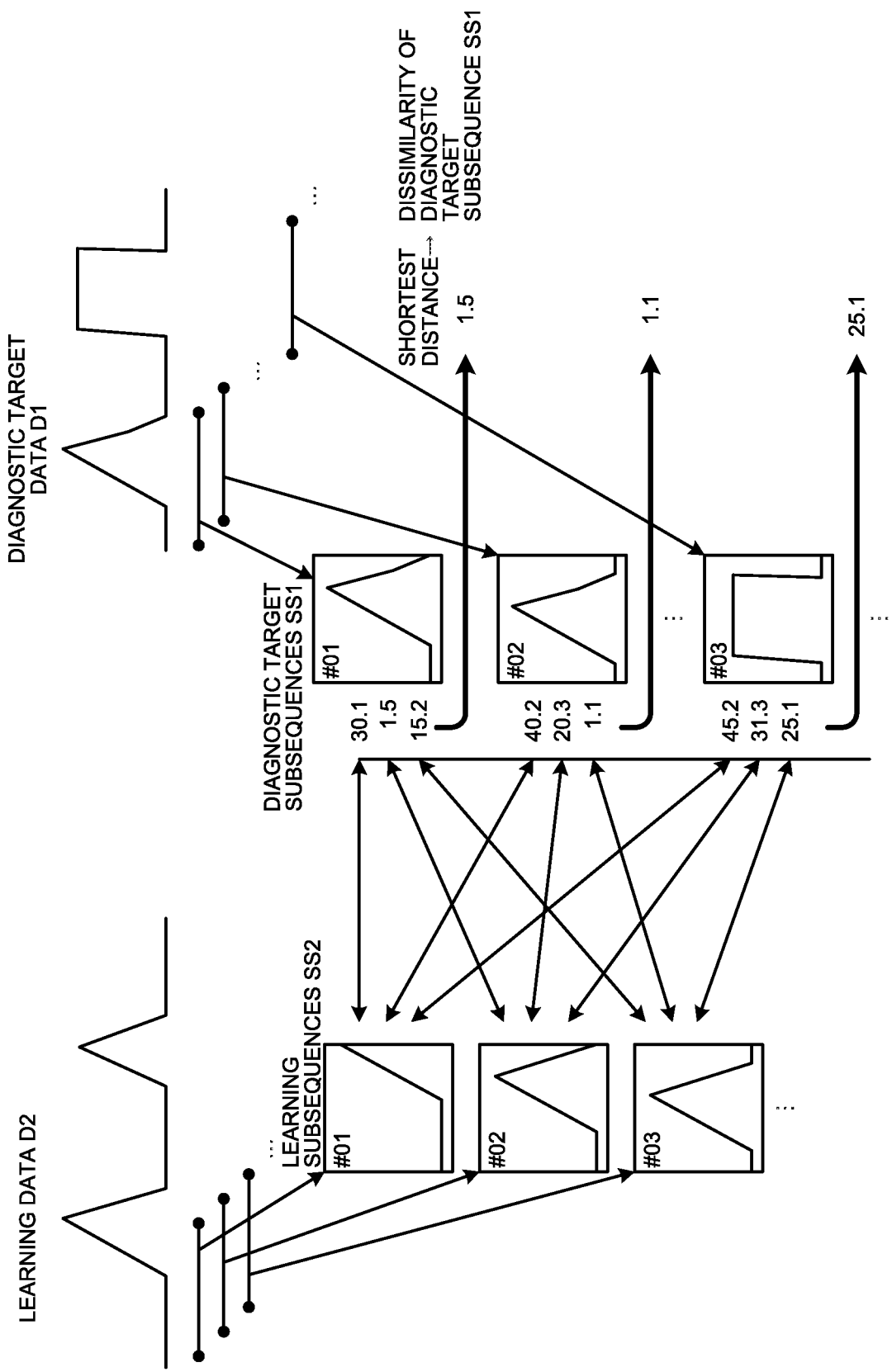
FIG. 3 is a diagram for explaining an outline of the nearest neighbor search used for determining whether the learning data illustrated in FIG. 2 include a waveform similar to the waveform of diagnostic target data.

FIG. 3 is a diagram for explaining an outline of the nearest neighbor search used for determining whether the learning data D2 illustrated in FIG. 2 include a waveform similar to the waveform of the diagnostic target data D1. Whether the learning data D2 include a waveform similar to the waveform of the diagnostic target data D1 is determined by using the dissimilarity between subsequences. The dissimilarity between subsequences indicates the degree to which the subsequences are different from each other. Lower dissimilarities indicate higher degrees of matching between subsequence waveforms. The dissimilarity between subsequences can be represented by, for example, a distance. In a case where subsequences are represented by points in a metric space, the dissimilarity between the subsequences is the distance between the points. The nearest neighbor search is a method of finding the point having the shortest distance to a specific point in a set of points in a metric space. In the present embodiment, a subsequence is regarded as a point, and the subsequence closest to a specific subsequence in a set of subsequences, that is, the subsequence with the lowest dissimilarity, is found. Learning subsequences SS2 are extracted from the learning data D2 while the extraction range having a predetermined fixed width (hereinafter, this width is referred to as a window size) is slid little by little. Diagnostic target subsequences SS1 are extracted from the diagnostic target data D1 with an extraction range of the same window size as the extraction range for the learning subsequences SS2. The nearest neighbor search is performed on each diagnostic target subsequence SS1, and the dissimilarity between each diagnostic target subsequence SS1 and the learning data D2 is calculated.

The dissimilarity between the diagnostic target subsequence SS1 and the learning data D2 is indicated by the dissimilarity between the diagnostic target subsequence SS1 and the learning subsequence SS2 whose waveform is most similar to the waveform of the diagnostic target subsequence SS1 among a plurality of learning subsequences SS2 extracted from the learning data D2. In a case where the dissimilarity is indicated by the distance between subsequences, the distances between all the extracted learning subsequences SS2 and the diagnostic target subsequence SS1 are calculated, and the shortest distance is set as the dissimilarity of the diagnostic target subsequence SS1. For example, consider a case where three learning subsequences SS2 are extracted. If the distance between the diagnostic target subsequence SS1#01 and the learning subsequence SS2#01 is 30.1, the distance between the diagnostic target subsequence SS1#01 and the learning subsequence SS2#02 is 1.5, and the distance between the diagnostic target subsequence SS1#01 and the learning subsequence SS2#03 is 15.2, the dissimilarity of the diagnostic target subsequence SS1#01 is 1.5. If the dissimilarity of the diagnostic target subsequence SS1 is equal to or less than a threshold, it is determined that the learning data D2 include a waveform similar to the waveform of the diagnostic target subsequence SS1.

It takes time to calculate dissimilarities for the combinations of all the learning subsequences SS2 and all the diagnostic target subsequences SS1 due to the large calculation amount. Therefore, in the present embodiment, similar learning subsequences SS2 are integrated into a sample subsequence SS3 (described later), and the nearest neighbor search is performed using the sample subsequence SS3. Consequently, it is possible to reduce the calculation amount for calculating dissimilarities and to shorten the time required for calculating dissimilarities.

Figure 4:
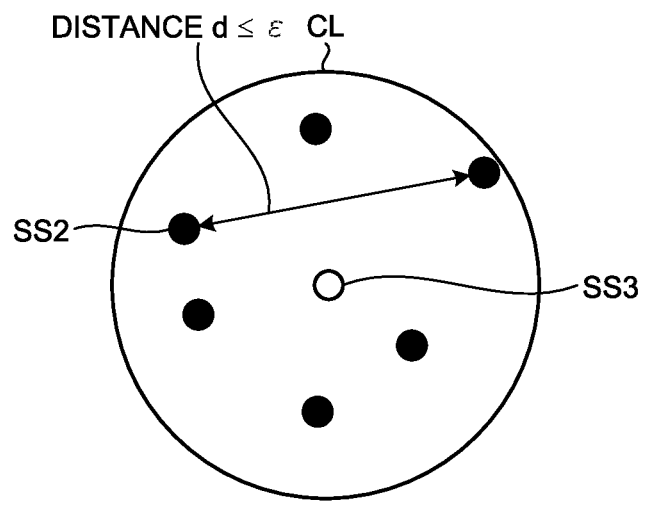
FIG. 4 is a diagram illustrating the relationship between a sample subsequence generated by the information processing apparatus illustrated in FIG. 1 and a sampling error upper limit.

FIG. 4 is a diagram illustrating the relationship between the sample subsequence SS3 generated by the information processing apparatus 10 illustrated in FIG. 1 and a sampling error upper limit ε. The information processing apparatus 10 classifies a plurality of learning subsequences SS2 into clusters CL and generates the sample subsequence SS3 representative of each cluster CL. The sample subsequence SS3 can also be defined as a subsequence obtained by integrating a plurality of similar learning subsequences SS2. The upper limit on the distance d, i.e., the dissimilarity between a plurality of learning subsequences SS2 to be integrated, is referred to as the sampling error upper limit ε. The sampling error upper limit ε can also be defined as the upper limit on the dissimilarity between the learning subsequences SS2 that belong to the same cluster CL. The sampling error upper limit ε is set as a criterion for determining whether a plurality of learning subsequences SS2 are similar subsequences. The range within which the learning subsequences SS2 are integrated varies in accordance with the sampling error upper limit ε. If the sampling error upper limit ε is too high, the dissimilarity between the learning subsequences SS2 to be integrated into the sample subsequence SS3 is increased, and thus the accuracy of diagnosis of the diagnostic target data D1 is degraded. If the sampling error upper limit ε is too low, the number of sample subsequences SS3 for use in diagnosis is increased, and processing takes a long time due to the large calculation amount. For this reason, there is a demand for a method of easily obtaining an appropriate sampling error upper limit ε that keeps a balance between diagnostic accuracy and processing time.

Referring again to FIG. 1, the information processing apparatus 10 has a function of calculating an appropriate sampling error upper limit ε on the basis of normal data D3, which are time-series data defined as normal in advance. For example, data acquired during normal operation of production equipment can be defined as normal data. The data acquisition unit 101 acquires the normal data D3 and acquires, from the normal data D3, the learning data D2 and trial data D4, which are data for diagnosis trial.

Figure 5:
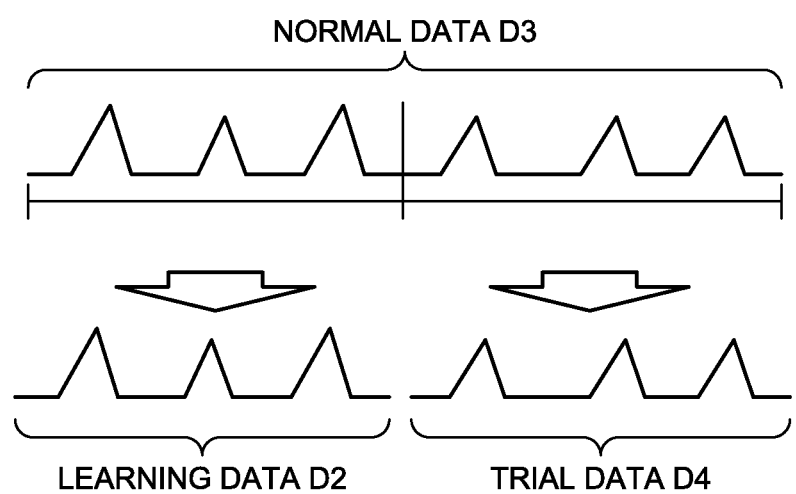
FIG. 5 is a diagram for explaining the function of a data acquisition unit illustrated in FIG. 1.

FIG. 5 is a diagram for explaining the function of the data acquisition unit 101 illustrated in FIG. 1. Upon acquiring the normal data D3, the data acquisition unit 101 divides the normal data D3 in half in terms of the number of records, and sets one of them as the learning data D2 and the other as the trial data D4. The data acquisition unit 101 inputs the acquired learning data D2 to the sampling error upper limit calculation unit 102 and the sample subsequence generation unit 103, and inputs the acquired trial data D4 to the sampling error upper limit calculation unit 102, the sample subsequence generation unit 103, and the statistical value calculation unit 104.

Figure 6:
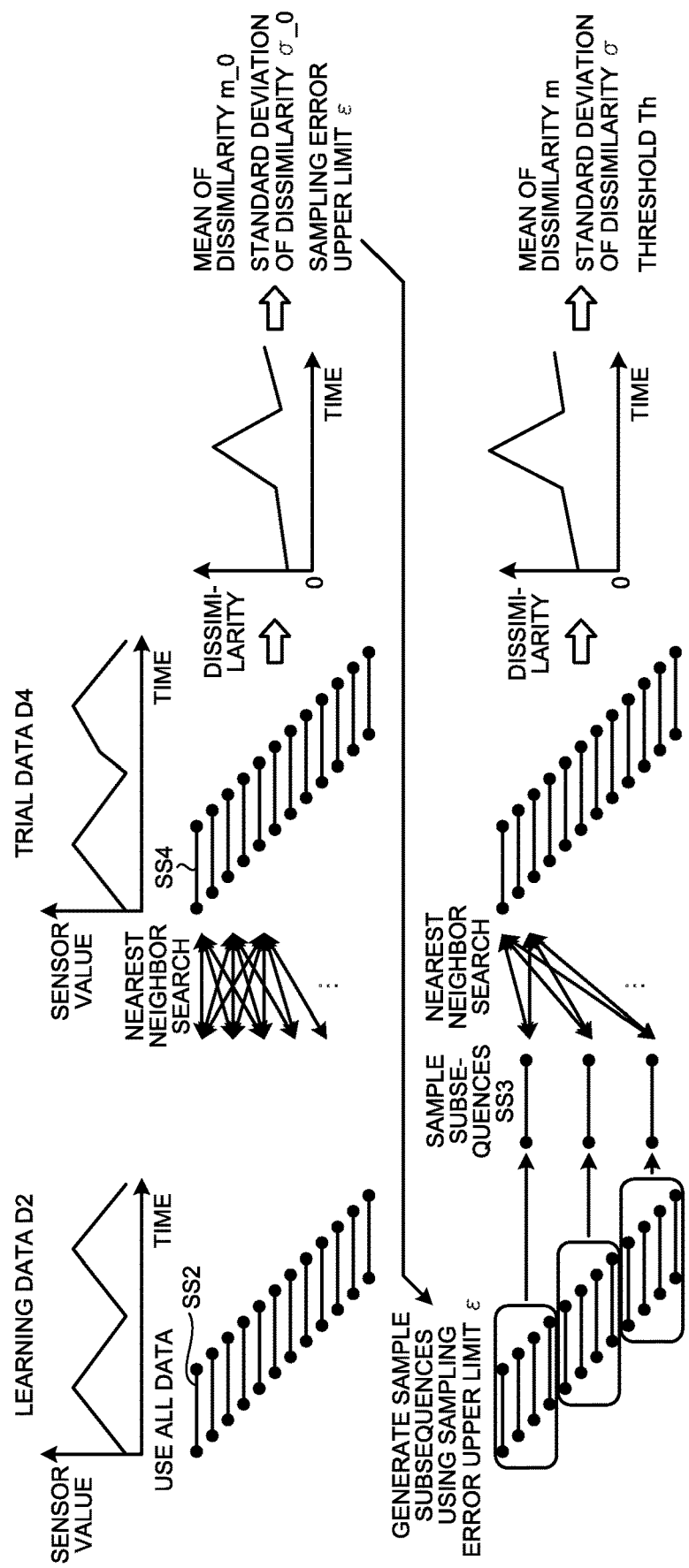
FIG. 6 is a diagram illustrating an outline of the process performed by the information processing apparatus illustrated in FIG. 1 before diagnosis.

FIG. 6 is a diagram illustrating an outline of the process performed by the information processing apparatus 10 illustrated in FIG. 1 before diagnosis. After the data acquisition unit 101 acquires the learning data D2 and the trial data D4, the sampling error upper limit calculation unit 102 of the information processing apparatus 10 performs a nearest neighbor search using all the learning subsequences SS2 extracted from the learning data D2 and the trial data D4 to calculate the sampling error upper limit ε. After calculating the sampling error upper limit ε, the sample subsequence generation unit 103 generates the sample subsequences SS3 using the calculated sampling error upper limit ε. Then, the statistical value calculation unit 104 performs a nearest neighbor search using the generated sample subsequences SS3 and the trial data D4 to calculate the dissimilarity between the learning data D2 and the trial data D4 and calculate statistical values of dissimilarity. The statistical values include the mean of dissimilarity m and the standard deviation of dissimilarity σ. By using the statistical values of dissimilarity calculated using the sampling error upper limit ε, the threshold calculation unit 106 calculates a threshold for use by the diagnosis unit 107. Details of these processes will be described below.

Referring again to FIG. 1, the sampling error upper limit calculation unit 102 calculates the sampling error upper limit ε using the learning data D2 and the trial data D4 that are input data. Specifically, the sampling error upper limit calculation unit 102 calculates the sampling error upper limit ε using the learning subsequences SS2 and trial subsequences SS4 that are data taken from the input data. The sampling error upper limit calculation unit 102 calculates dissimilarities for all the combinations of the learning subsequences SS2 and the trial subsequences SS4, and sets the minimum dissimilarity of each of the trial subsequences SS4 as the dissimilarity of the trial subsequence SS4. The sampling error upper limit calculation unit 102 calculates statistical values of dissimilarity on the basis of the dissimilarity of each trial subsequence SS4. Specifically, the statistical values of dissimilarity is the mean of dissimilarity m_0 and the standard deviation of dissimilarity σ_0. Assuming that the number of trial subsequences SS4 is "n" and the dissimilarity of the i-th trial subsequence SS4 is "a_i", the mean of dissimilarity m_0 calculated using all the learning subsequences SS2 is expressed by mathematical expression (1) below, and the standard deviation of dissimilarity σ_0 is expressed by mathematical expression (2) below.

[Formula 1]

$$m\_0 = \frac{1}{n}\sum_{i=1}^{n} a\_i \quad (1)$$

[Formula 2]

$$\sigma\_0 = \sqrt{\frac{1}{n}\sum_{i=1}^{n}(a\_i - m\_0)^2} \quad (2)$$

The sampling error upper limit calculation unit 102 can calculate the sampling error upper limit ε using these statistical values and a predetermined calculation formula. Assuming that reference character "k" is a positive real number, the predetermined calculation formula is mathematical expression (3) below.

$$\varepsilon = k(m\_0 + 3\sigma\_0) \quad (3)$$

Figure 7:
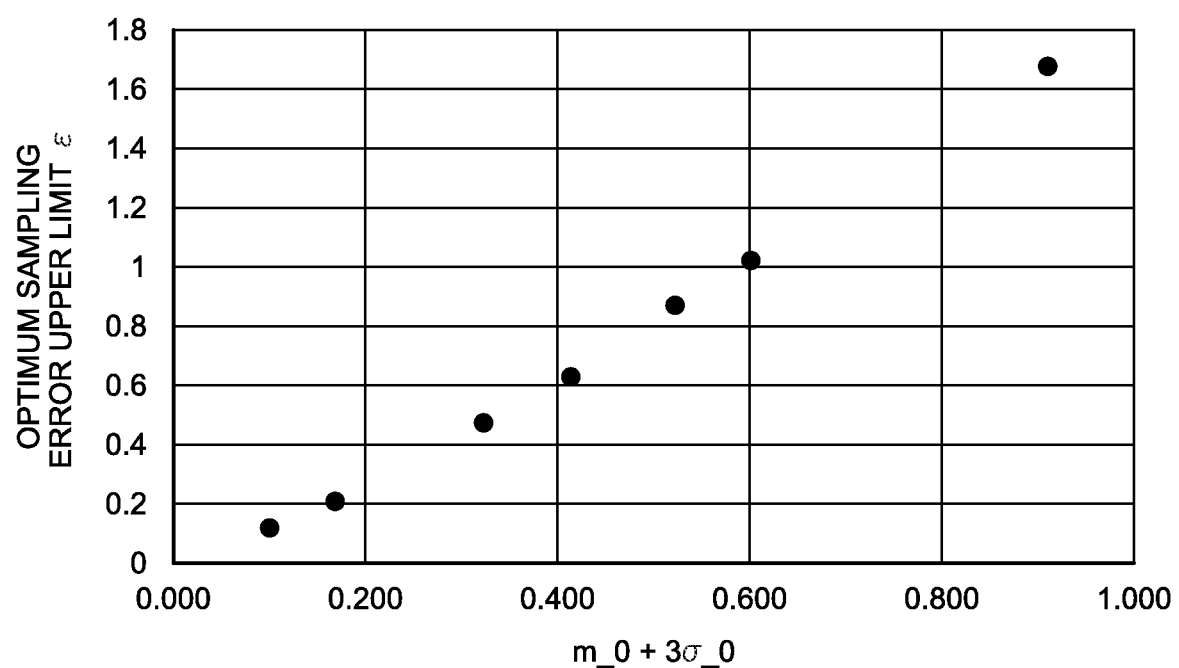
FIG. 7 is a diagram illustrating the validity of the calculation formula used by a sampling error upper limit calculation unit illustrated in FIG. 1.

Mathematical expression (3) indicates that there is a linear correlation between the sampling error upper limit ε and the sum of the mean of dissimilarity m_0 and a real multiple of the standard deviation of dissimilarity σ_0, for example, three times the standard deviation of dissimilarity σ_0. FIG. 7 is a diagram illustrating the validity of the calculation formula used by the sampling error upper limit calculation unit 102 illustrated in FIG. 1. In FIG. 7, the horizontal axis represents "m_0+3σ_0", and the vertical axis represents the optimum sampling error upper limit ε. Here, the optimum sampling error upper limit ε is defined as a value that makes the difference between the dissimilarity calculated using all the learning subsequences SS2 extracted from the learning data D2 and the dissimilarity calculated using the sample subsequences SS3 equal to or less than a predetermined ratio. As the result of computing dissimilarities under various conditions using the learning data D2 and the trial data D4, the linear correlation illustrated in FIG. 7 was confirmed between "m_0+3σ_0" and the optimum sampling error upper limit ε. The sampling error upper limit calculation unit 102 inputs the calculated sampling error upper limit ε. to the sample subsequence generation unit 103, and stores it in the storage unit 105.

The sample subsequence generation unit 103 generates the sample subsequences SS3 using the input sampling error upper limit ε., the learning data D2, and the trial data D4. The sample subsequence SS3 is obtained by integrating similar learning subsequences SS2. In the learning data D2, the learning subsequences SS2 temporally close to each other are likely to be similar to each other, and similar subsequences are likely to appear repeatedly. Therefore, the sample subsequence generation unit 103 firstly performs the first integration process of extracting, from the learning data D2, the learning subsequences SS2 temporally close to each other and having dissimilarities equal to or less than a predetermined value, and placing the extracted learning subsequences SS2 in the same cluster CL. Then, the sample subsequence generation unit 103 performs the second integration process of integrating a plurality of clusters CL on the basis of the dissimilarity between the clusters CL.

Figure 8:
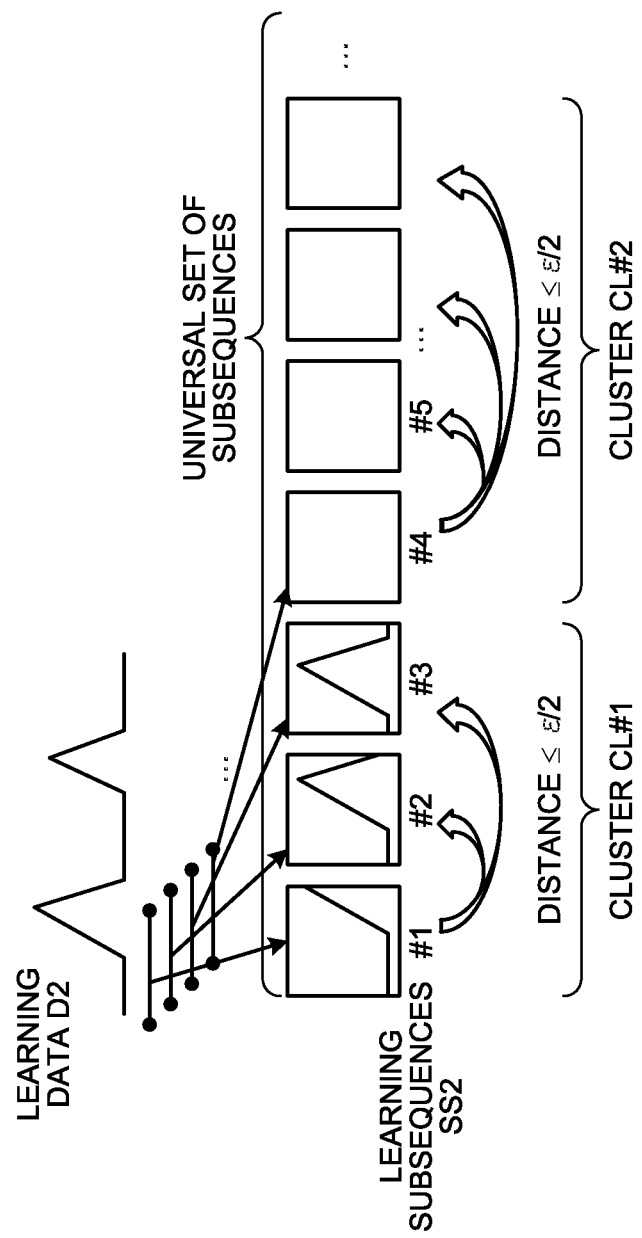
FIG. 8 is a diagram illustrating an outline of the first integration process performed by a sample subsequence generation unit illustrated in FIG. 1.

FIG. 8 is a diagram illustrating an outline of the first integration process performed by the sample subsequence generation unit 103 illustrated in FIG. 1. The sample subsequence generation unit 103 integrates the learning subsequences SS2 temporally close to each other and having dissimilarities within a predetermined range. Here, dissimilarity is indicated by distance. Specifically, the sample subsequence generation unit 103 calculates the distance d between specific learning subsequences SS2, e.g., the learning subsequence SS2#1 and the learning subsequence SS2#2. If the relationship d≤ε/2 is satisfied, the sample subsequence generation unit 103 places the learning subsequence SS2#1 and the learning subsequence SS2#2 in the same cluster CL #1. Similarly, the sample subsequence generation unit 103 calculates the distance d between the learning subsequence SS2#1 and the learning subsequence SS2#3. If the relationship d≤ε/2 is satisfied, the sample subsequence generation unit 103 places the learning subsequence SS2#3 in the cluster CL #1. If the distance d between the learning subsequence SS2#1 and the learning subsequence SS2#4 satisfies d>ε/2, the sample subsequence generation unit 103 places the learning subsequence SS2#4 in a new cluster CL #2. In response to switching to the new cluster CL, the sample subsequence generation unit 103 calculates the distances d between the learning subsequence SS2#4 placed in the new cluster CL #2 and other learning subsequences SS2 sequentially along the time axis, and clusters the learning subsequences SS2 in a similar manner. The sample subsequence generation unit 103 generates a list of clusters CL as the result of the first integration process.

Figure 9:
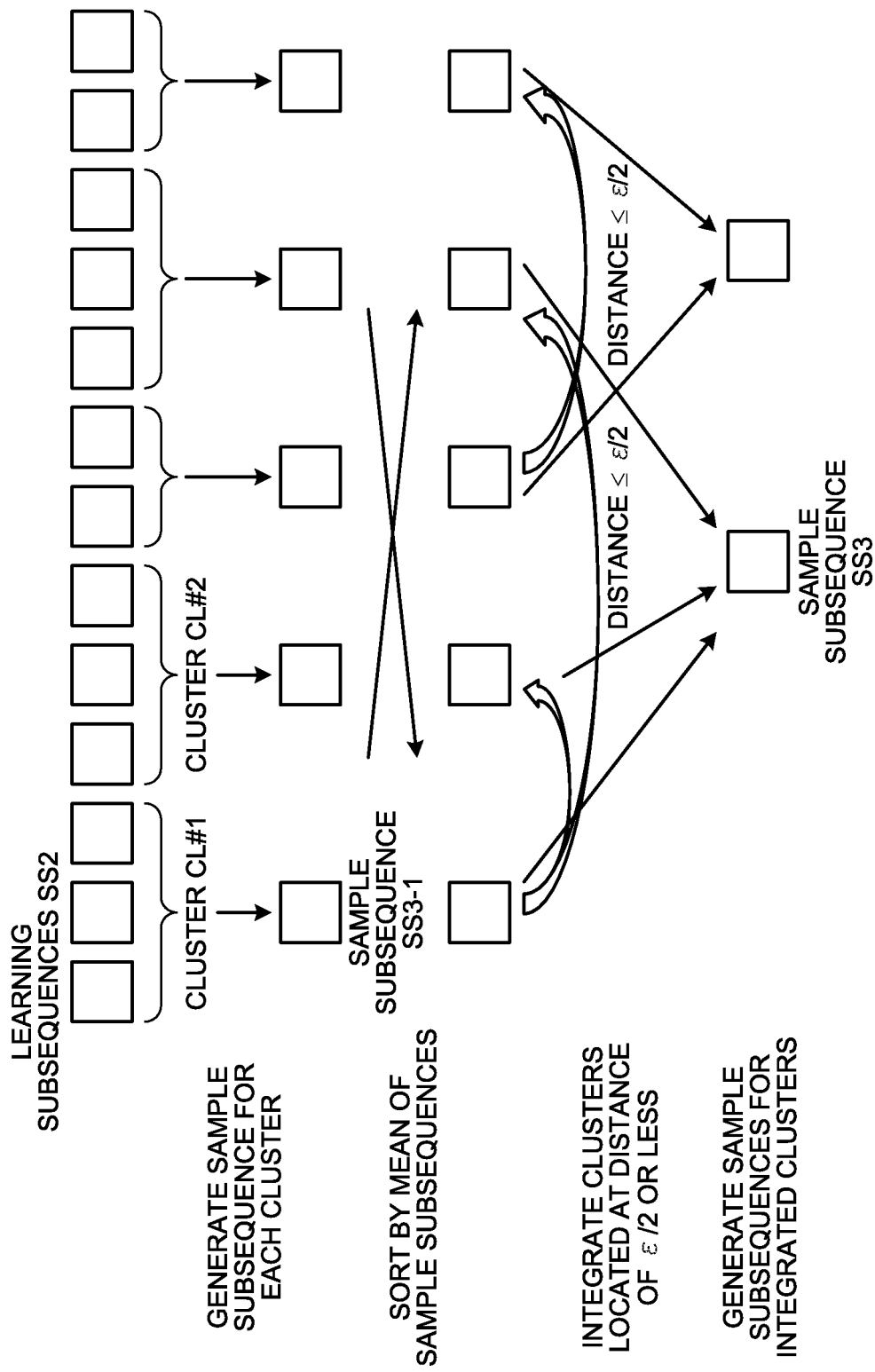
FIG. 9 is a diagram illustrating an outline of the second integration process performed by the sample subsequence generation unit illustrated in FIG. 1.

FIG. 9 is a diagram illustrating an outline of the second integration process performed by the sample subsequence generation unit 103 illustrated in FIG. 1. On the basis of the list of clusters CL that is the result of the first integration process, the sample subsequence generation unit 103 generates a sample subsequence SS3-1 for each cluster CL using the plurality of learning subsequences SS2 that belong to the corresponding cluster CL. Specifically, the sample subsequence generation unit 103 computes, from the plurality of learning subsequences SS2 that belong to each cluster CL, the mean of a plurality of values having the same index with respect to values included in the learning subsequences SS2, and sets a subsequence including a series of means as a sample subsequence SS3-1 for each cluster CL.

The sample subsequence generation unit 103 sorts the list of sample subsequences SS3-1 by the mean of the sample subsequences SS3-1. Then, the sample subsequence generation unit 103 computes the distances d between subsequences using the list of rearranged sample subsequences SS3-1 in the same way as in the first integration process, and integrates the clusters CL whose sample subsequences SS3-1 are located at a distance d of ε/2 or less. The sample subsequence generation unit 103 generates the sample subsequence SS3 using the sample subsequences SS3-1 that belong to the integrated clusters CL. Specifically, the sample subsequence generation unit 103 computes, from the sample subsequences SS3-1, the mean of a plurality of values having the same index with respect to values included in sample subsequences SS3-1, and sets a subsequence including a series of means as the sample subsequence SS3. The sample subsequence generation unit 103 may compute the mean of values having the same index with respect to values included in the learning subsequences SS2 included in each cluster CL for which the sample subsequence SS3-1 has been generated, and set a subsequence including a series of means as the sample subsequence SS3. The sample subsequence generation unit 103 inputs the generated sample subsequences SS3 to the statistical value calculation unit 104, and stores them in the storage unit 105. The sample subsequence generation unit 103 may also compute the mean of the generated sample subsequences SS3, and store it in the storage unit 105 together with the sample subsequences SS3.

Referring again to FIG. 1, the statistical value calculation unit 104 calculates statistical values of dissimilarity between the learning data D2 and the trial data D4 using the generated sample subsequences SS3 and the trial data D4. The statistical value calculation unit 104 executes a nearest neighbor search on the trial data D4 using the sample subsequences SS3 to compute dissimilarities. The statistical value calculation unit 104 calculates the mean of dissimilarity m and the standard deviation of dissimilarity 6, and stores them in the storage unit 105.

Using the mean of dissimilarity m and the standard deviation of dissimilarity 6 calculated by the statistical value calculation unit 104, the threshold calculation unit 106 calculates a threshold Th to be used by the diagnosis unit 107 to diagnose whether the learning data D2 include a waveform similar to the waveform of the diagnostic target data D1. The diagnosis unit 107 uses the threshold Th calculated by the threshold calculation unit 106 to diagnose whether the learning data D2 include a waveform similar to the waveform of the diagnostic target data D1. If the learning data D2 include a waveform similar to the waveform of the diagnostic target data D1, the diagnosis unit 107 determines that the diagnostic target data D1 are normal. If the learning data D2 do not include a waveform similar to the waveform of the diagnostic target data D1, the diagnosis unit 107 determines that the diagnostic target data D1 are abnormal.

Figure 10:
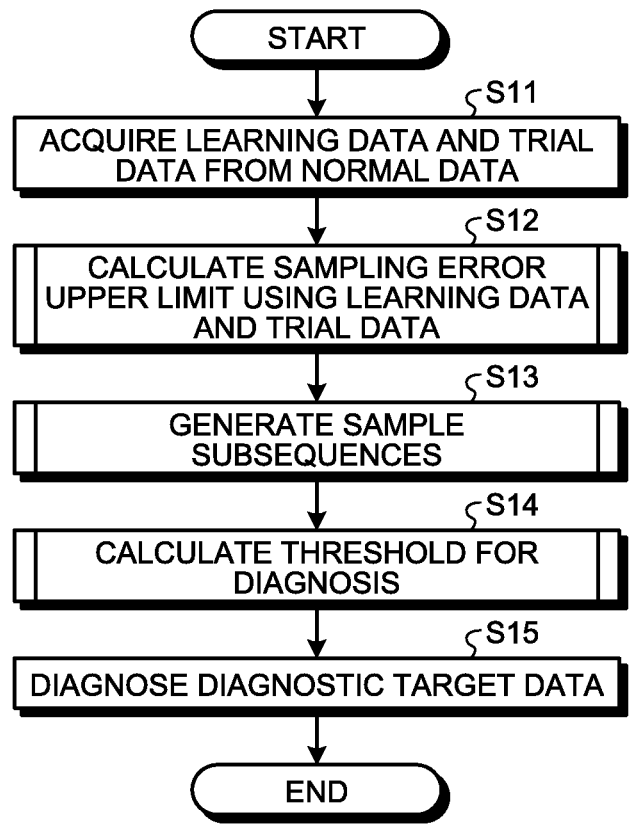
FIG. 10 is a flowchart illustrating the whole process executed by the information processing apparatus illustrated in FIG. 1.

FIG. 10 is a flowchart illustrating the whole process executed by the information processing apparatus 10 illustrated in FIG. 1. The data acquisition unit 101 of the information processing apparatus 10 acquires the learning data D2 and the trial data D4 from the normal data D3 (step S11). The sampling error upper limit calculation unit 102 calculates the sampling error upper limit ε using the learning data D2 and the trial data D4 acquired by the data acquisition unit 101 (step S12). Details of the method of calculating the sampling error upper limit ε will be described later.

The sample subsequence generation unit 103 generates the sample subsequences SS3 using the calculated sampling error upper limit ε and the learning data D2 (step S13). Details of the method of generating the sample subsequences SS3 will be described later. Using the generated sample subsequences SS3, the threshold calculation unit 106 calculates the threshold Th for use in diagnosis of the diagnostic target data D1 (step S14). Details of the method of calculating the threshold Th will be described later. The diagnosis unit 107 diagnoses the diagnostic target data D1 (step S15).

The series of processes illustrated in FIG. 10 need not necessarily be executed continuously. For example, steps S11 to S13 may be executed in advance as preparatory work. Further, it is sufficient if the threshold calculation process in step S14 is performed before the diagnosis process in step S15 is executed. Hereinafter, the detailed operation of each step illustrated in FIG. 10 will be described.

Figure 11:
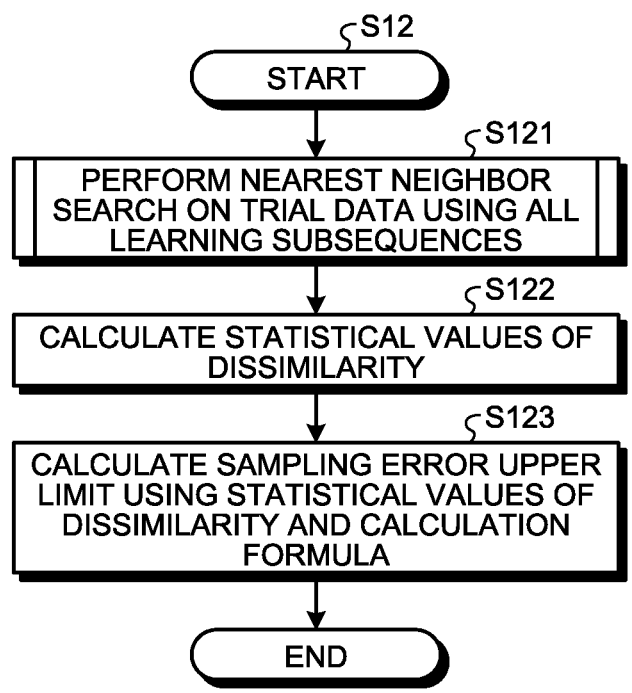
FIG. 11 is a flowchart illustrating the detailed operation of step S12 illustrated in FIG. 10.
Figure 12:
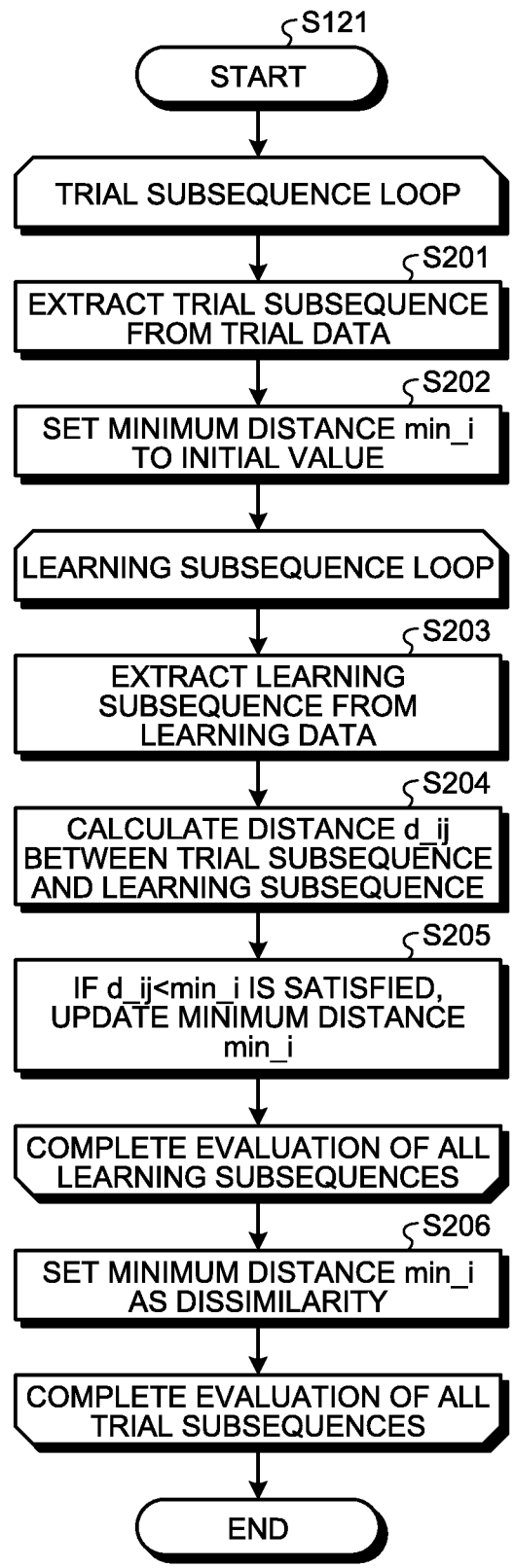
FIG. 12 is a flowchart illustrating the detailed operation of step S121 illustrated in FIG. 11.

FIG. 11 is a flowchart illustrating the detailed operation of step S12 illustrated in FIG. 10. The sampling error upper limit calculation unit 102 performs a nearest neighbor search on the trial data D4 using all the learning subsequences SS2 extracted from the learning data D2 to calculate dissimilarities (step S121). FIG. 12 is a flowchart illustrating the detailed operation of step S121 illustrated in FIG. 11. The sampling error upper limit calculation unit 102 extracts the trial subsequence SS4 from the trial data D4 (step S201). Specifically, the sampling error upper limit calculation unit 102 extracts, as the trial subsequences SS4, pieces of waveform data of the predetermined window size w from the trial data D4 of the length p while sliding the extraction area little by little. The sampling error upper limit calculation unit 102 sets the minimum distance min_i to infinity, the initial value (step S202).

The sampling error upper limit calculation unit 102 extracts, as the learning subsequence SS2, a piece of waveform data of the window size w from the learning data D2 of the length q (step S203). The sampling error upper limit calculation unit 102 calculates the distance d_ij between the trial subsequence SS4 and the learning subsequence SS2 (step S204). Assuming that the time series data of the trial subsequence SS4 are S[i:i+w−1](i=1, 2, 3, . . . , p−w+1) and the time-series data of the learning subsequence SS2 are T[j:j+w−1] (j=1, 2, 3, . . . , q−w+1), the distance d_ij can be computed using mathematical expression (4) below.

[Formula 3]

$$d\_ij = \sqrt{\sum_{k=0}^{w-1}(S[i+k] - T[j+k])^2} \quad (3)$$

If the relationship d_ij<min_i is satisfied, the sampling error upper limit calculation unit 102 updates the value of the minimum distance min_i to the value of the distance d_ij (step S205). The sampling error upper limit calculation unit 102 repeats steps S203 to S205 until the evaluation of all the learning subsequences SS2 is completed while sliding the range of extracting the learning subsequence SS2 little by little in step S203.

Upon completion of the evaluation of all the learning subsequences SS2, the sampling error upper limit calculation unit 102 sets the minimum distance min_i as the dissimilarity of the current trial subsequence SS4 (step S206). The sampling error upper limit calculation unit 102 repeats steps S201 to S206 until the evaluation of all the trial subsequences SS4 is completed while sliding the range of extracting the trial subsequence SS4 little by little in step S201. Step S121 enables the sampling error upper limit calculation unit 102 to acquire the dissimilarity of each trial subsequence SS4.

Referring again to FIG. 11, upon acquiring the dissimilarity of each trial subsequence SS4, the sampling error upper limit calculation unit 102 calculates the mean m_0 and standard deviation σ_0 of dissimilarity, which are statistical values of the acquired dissimilarities (step S122). The sampling error upper limit calculation unit 102 calculates the sampling error upper limit ε using the statistical values of dissimilarity and the predetermined calculation formula (step S123).

Figure 13:
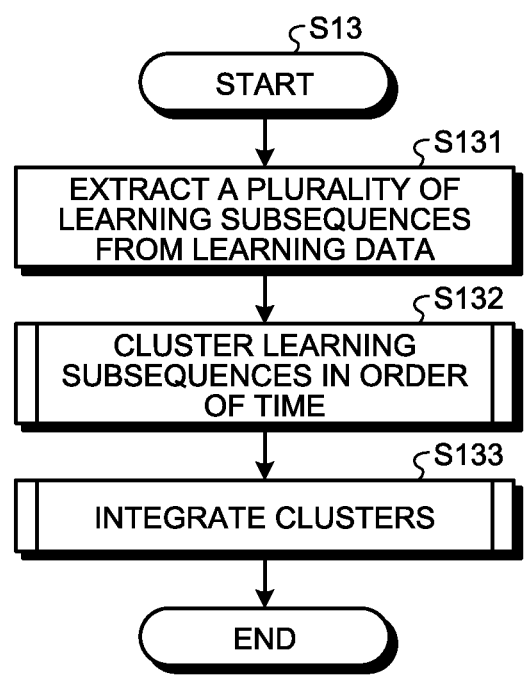
FIG. 13 is a flowchart illustrating the detailed operation of step S13 illustrated in FIG. 10.

FIG. 13 is a flowchart illustrating the detailed operation of step S13 illustrated in FIG. 10. The sample subsequence generation unit 103 extracts a plurality of learning subsequences SS2 from the learning data D2 (step S131). The sample subsequence generation unit 103 clusters the learning subsequences SS2 in order of time and classifies them into a plurality of clusters CL (step S132) Thereafter, the sample subsequence generation unit 103 integrates the clusters CL and generates the sample subsequence SS3 for each cluster CL (step S133).

Figure 14:
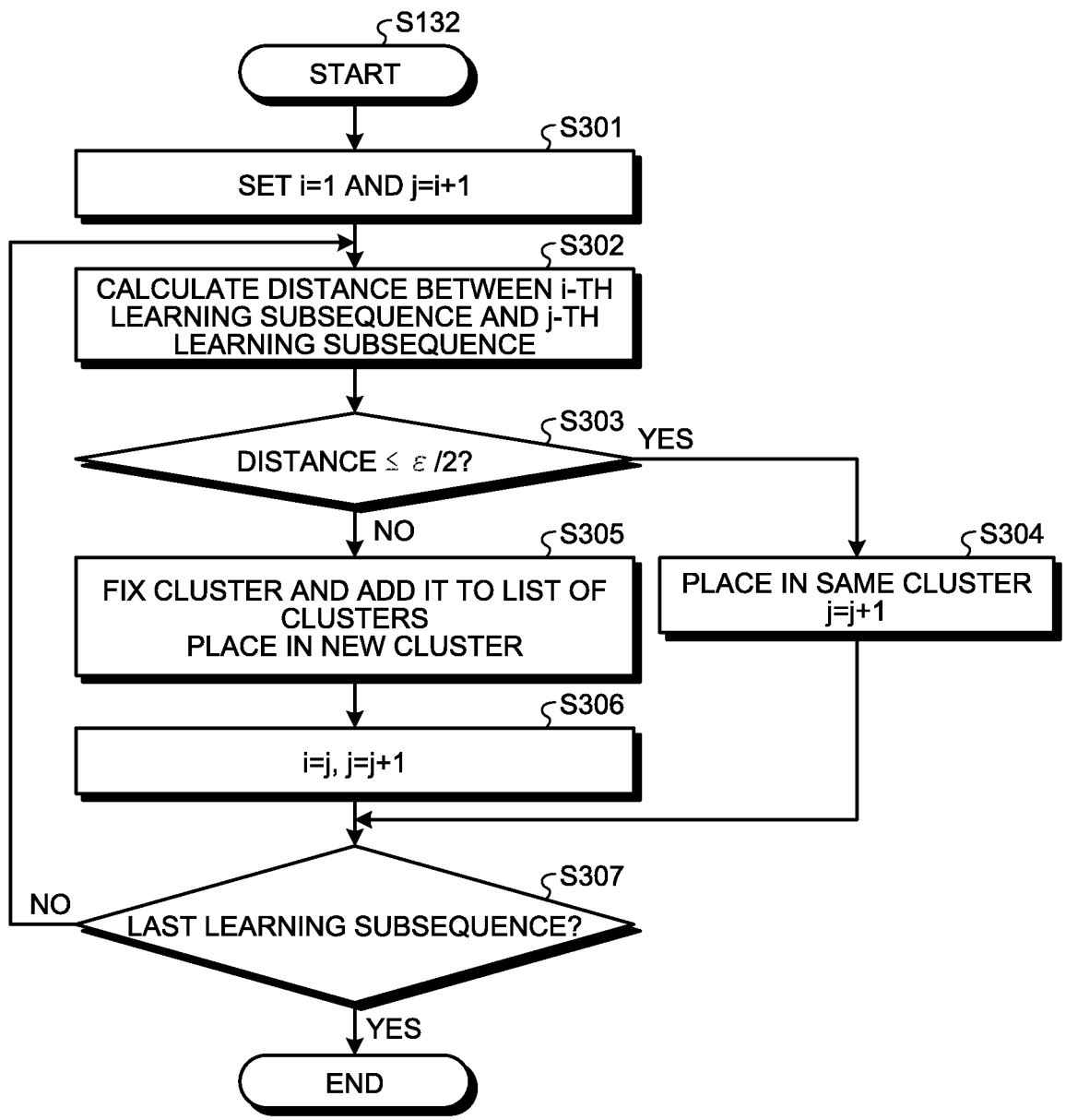
FIG. 14 is a flowchart illustrating details of the first integration process of step S132 illustrated in FIG. 13.

FIG. 14 is a flowchart illustrating the details of the first integration process of step S132 illustrated in FIG. 13. First, the sample subsequence generation unit 103 sets ordinal numbers "i" and "j" to i=1 and j=i+1, respectively (step S301). The ordinal numbers "i" and "j" each indicate the order of the learning subsequences SS2. The sample subsequence generation unit 103 calculates the distance between the i-th learning subsequence SS2 and the j-th learning subsequence SS2 (step S302). The sample subsequence generation unit 103 determines whether the calculated distance is equal to or less than ε/2 (step S303). If the distance is equal to or less than ε/2 (step S303: Yes), the sample subsequence generation unit 103 places the j-th learning subsequence SS2 in the same cluster CL as the i-th learning subsequence SS2 and sets j=j+1 (step S304).

If the distance exceeds ε/2 (step S303: No), the sample subsequence generation unit 103 fixes the cluster CL and adds it to the list of clusters CL. Further, the sample subsequence generation unit 103 places the j-th learning subsequence SS2 in a new cluster CL (step S305). The sample subsequence generation unit 103 sets i=j and j=j+1 (step S306). After performing step S304 or after performing step S306, the sample subsequence generation unit 103 determines whether the current learning subsequence SS2 is the last learning subsequence SS2 (step S307). If the current learning subsequence SS2 is not the last learning subsequence SS2 (step S307: No), the sample subsequence generation unit 103 returns to step S302 and repeats the subsequent steps. If the current learning subsequence SS2 is the last learning subsequence SS2 (step S307: Yes), the sample subsequence generation unit 103 ends the process. When the process illustrated in FIG. 14 is executed, the learning subsequences SS2 temporally close to each other and having distances equal to or less than ε/2 are placed in the same cluster CL as illustrated in FIG. 8.

Figure 15:
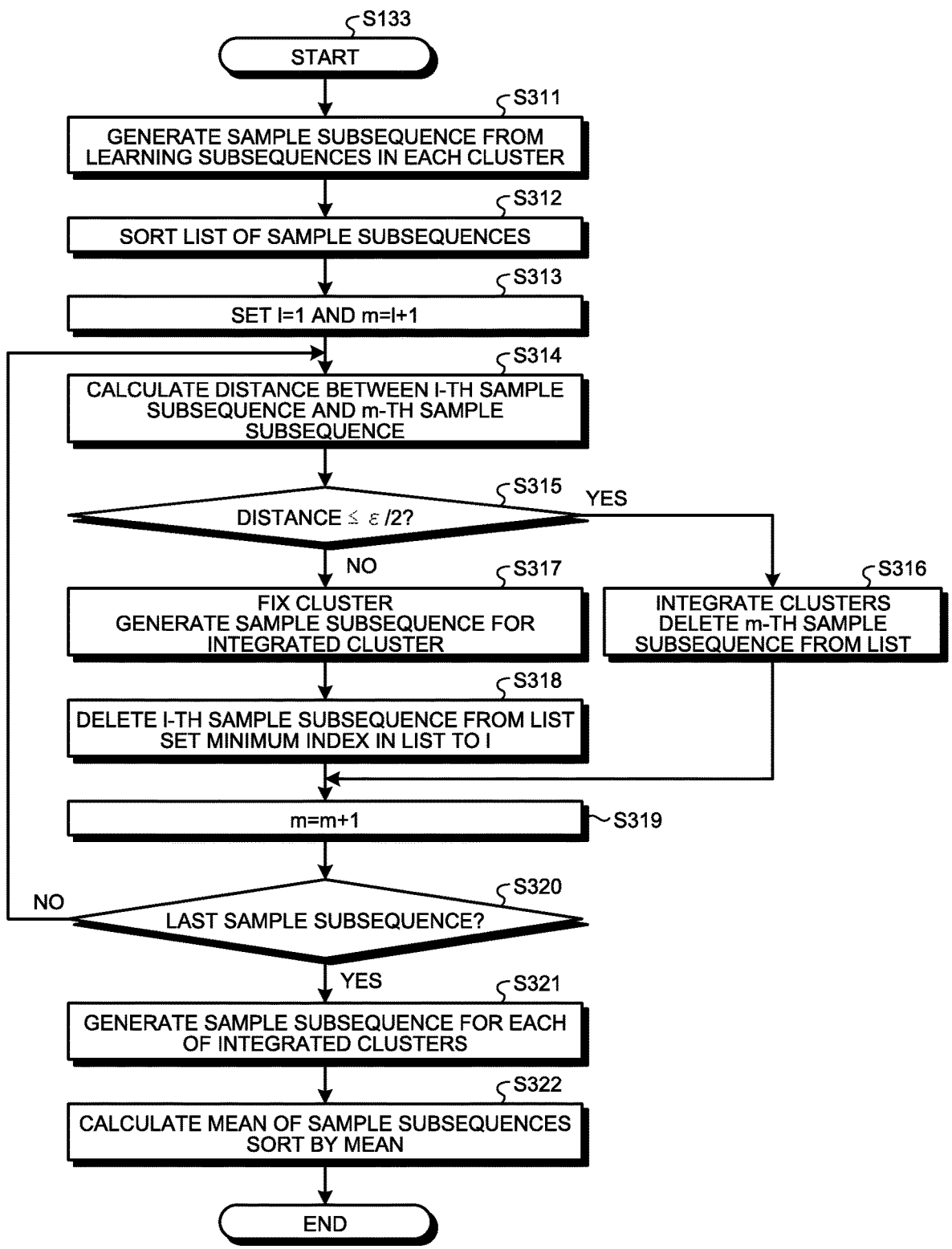
FIG. 15 is a flowchart illustrating details of the second integration process of step S133 illustrated in FIG. 13.

FIG. 15 is a flowchart illustrating details of the second integration process of step S133 illustrated in FIG. 13. The sample subsequence generation unit 103 generates a sample subsequence SS3-1 for each cluster CL from the learning subsequences SS2 in the corresponding cluster CL generated in step S132 (step S311). The sample subsequence generation unit 103 sorts the list of sample subsequences SS3-1 by the mean of the sample subsequences SS3-1 (step S312). The sample subsequence generation unit 103 sets ordinal numbers "l" and "m" to l=1 and m=l+1, respectively (step S313). The ordinal numbers "l" and "m" each indicate the order of sample subsequences SS3-1.

The sample subsequence generation unit 103 calculates the distance d between the l-th sample subsequence SS3-1 and the m-th sample subsequence SS3-1 (step S314). The sample subsequence generation unit 103 determines whether the calculated distance d is equal to or less than ε/2 (step S315). If the distance d is equal to or less than ε/2 (step S315: Yes), the sample subsequence generation unit 103 integrates the clusters CL and deletes the m-th sample subsequence SS3-1 from the list (step S316) If the distance d exceeds ε/2 (step S315: No), the sample subsequence generation unit 103 fixes the cluster CL and generates the sample subsequence SS3 for the integrated clusters CL (step S317). The sample subsequence generation unit 103 deletes the l-th sample subsequence SS3-1 from the list and sets the minimum index in the list to l (step S318). Upon completion of step S316 or step S318, the sample subsequence generation unit 103 sets m=m+1 (step S319).

The sample subsequence generation unit 103 determines whether the current sample subsequence SS3-1 is the last sample subsequence SS3-1 (step S320). If the current sample subsequence SS3-1 is not the last sample subsequence SS3-1 (step S320: No), the sample subsequence generation unit 103 returns to step S314 and repeats the subsequent steps. If the current sample subsequence SS3-1 is the last sample subsequence SS3-1 (step S320: Yes), the sample subsequence generation unit 103 generates the sample subsequence SS3 for each of the integrated clusters CL (step S321). The sample subsequence generation unit 103 calculates the mean of the sample subsequences SS3 and sorts the sample subsequences SS3 by the mean (step S322). In this manner, the sample subsequences SS3 are generated.

Figure 16:
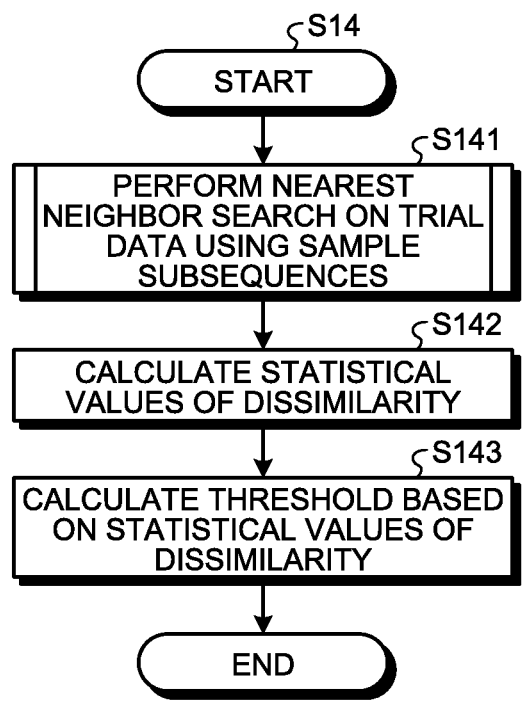
FIG. 16 is a flowchart illustrating the detailed operation of step S14 illustrated in FIG. 10.

FIG. 16 is a flowchart illustrating the detailed operation of step S14 illustrated in FIG. 10. The statistical value calculation unit 104 performs a nearest neighbor search on the trial data D4 using the generated sample subsequences SS3 to calculate dissimilarities (step S141). The statistical value calculation unit 104 calculates statistical values of the calculated dissimilarities (step S142). The statistical values are the mean m and the standard deviation σ. The threshold calculation unit 106 calculates the threshold Th on the basis of the calculated statistical values of dissimilarity (step S143).

Figure 17:
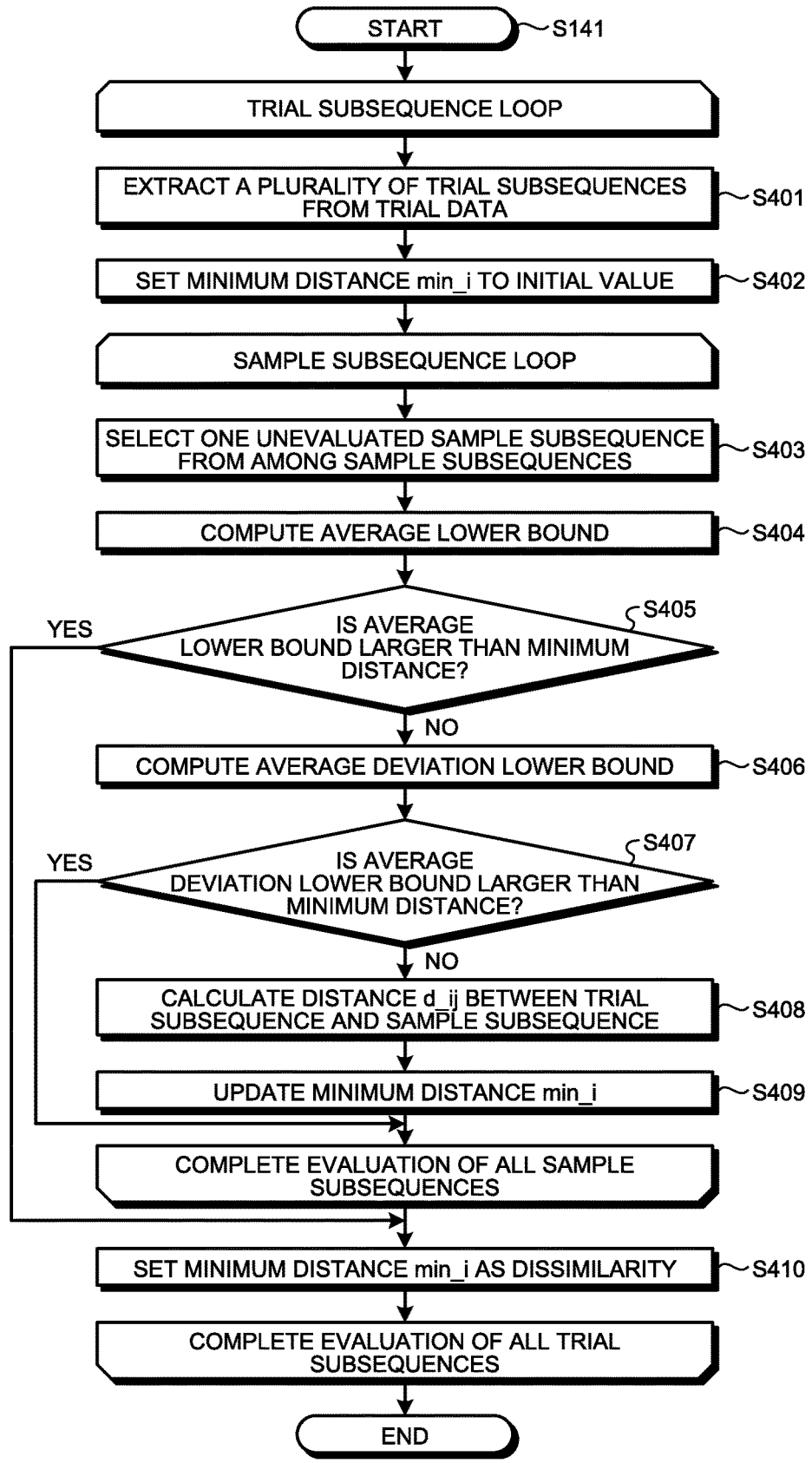
FIG. 17 is a flowchart illustrating the detailed operation of step S141 illustrated in FIG. 16.

FIG. 17 is a flowchart illustrating the detailed operation of step S141 illustrated in FIG. 16. Here, the nearest neighbor search process is accelerated using the lower bound calculation.

The statistical value calculation unit 104 extracts the trial subsequence SS4 from the trial data D4 (step S401). The minimum distance min_i is set to infinity, the initial value (step S402). The statistical value calculation unit 104 selects one unevaluated sample subsequence SS3 from among the sample subsequences SS3 (step S403). The statistical value calculation unit 104 computes the average lower bound using the extracted trial subsequence SS4 and the selected sample subsequence SS3 (step S404). Assuming that the window size is "w" and the mean of time-series data T and the mean of time-series data S are represented by T and S with bars, respectively, the average lower bound can be expressed by mathematical expression (5) below.

[Formula 4]
$$\sqrt{w} \cdot |\overline{T} - \overline{S}| \tag{5}$$

The statistical value calculation unit 104 determines whether the computed average lower bound is larger than the minimum distance min_i (step S405). If the average lower bound is larger than the minimum distance min_i (step S405: Yes), the statistical value calculation unit 104 skips the subsequent steps and sets the minimum distance min_i as the dissimilarity (step S410). If the average lower bound is equal to or less than the minimum distance min_i (step S405: No), the statistical value calculation unit 104 computes the average deviation lower bound (step S406). Assuming that the standard deviations of time-series data T and S are Std(T) and Std(S), respectively, the average deviation lower bound can be expressed by mathematical expression (6) below.

[Formula 5]
$$\sqrt{w} \cdot \sqrt{(\overline{T} - \overline{S})^2 + (\text{Std}(T) - \text{Std}(S))^2} \tag{6}$$

The statistical value calculation unit 104 determines whether the computed average deviation lower bound is larger than the minimum distance min_i (step S407) If the average deviation lower bound is larger than the minimum distance min_i (step S407: Yes), the statistical value calculation unit 104 ends the process for the current sample subsequence SS3. If not all the sample subsequences SS3 have been evaluated, the statistical value calculation unit 104 returns to step S403. If the average deviation lower bound is equal to or less than the minimum distance min_i (step S407: No), the statistical value calculation unit 104 calculates the distance d_ij between the trial subsequence SS4 and the sample subsequence SS3 (step S408).

Assuming that the diagnostic target subsequence is "S" and the sample subsequence is "$T_j$", the distance d_ij can be expressed by mathematical expression (7) below.

[Formula 6]
$$d\_ij = \sqrt{\sum_{k=0}^{w-1} (S[i+k] - T_j[k+1])^2} \tag{7}$$

If the calculated distance d_ij is less than the minimum distance min_i, the statistical value calculation unit 104 updates the minimum distance min_i to the value of the distance d_ij (step S409). The statistical value calculation unit 104 repeats steps S403 to S409 until the evaluation of all the sample subsequences SS3 is completed. Upon completion of the evaluation of all the sample subsequences SS3, the statistical value calculation unit 104 sets the minimum distance min_i as the dissimilarity (step S410). The statistical value calculation unit 104 repeats steps S401 to S410 until the evaluation of all the trial subsequences SS4 is completed.

If it is possible to determine, by using the average lower bound and the average deviation lower bound, that the distance between subsequences is larger than the minimum distance min_i without calculating the distance between subsequences, the process of calculating the distance between subsequences can be skipped. The calculation amount for the process of calculating the average lower bound and the average deviation lower bound is smaller than that for the process of calculating the distance between subsequences, so that the nearest neighbor search process can be accelerated. It should be noted that the nearest neighbor search process illustrated in step S141 is not necessarily performed using the lower bound calculation as illustrated in FIG. 17, but may be performed without using the lower bound calculation as illustrated in FIG. 12. This can be achieved simply by replacing the learning subsequences SS2 with the sample subsequences SS3 and replacing the process of extracting the learning subsequence SS2 from the learning data D2 with the process of selecting one sample subsequence SS3.

The learning data D2 may not include a waveform similar to the waveform of the diagnostic target data D1 that should be diagnosed as normal, and the diagnostic target data D1 may be diagnosed as abnormal by the information processing apparatus 10. In this case, it is desirable to add the diagnostic target data D1 diagnosed as abnormal to the learning data D2. Therefore, in response to accepting an instruction to add, to the learning data D2, dissimilar data that are the diagnostic target data D1 with respect to which the diagnosis unit 107 has determined that a waveform similar to its waveform is not included in the learning data D2, the data acquisition unit 101 adds the dissimilar data to the learning data D2.

In a case where the diagnostic target data D1 are sensor data for detecting the state of production equipment, the diagnostic target data D1 that should be diagnosed as normal are sensor data acquired when no detectable abnormality occurs in the production equipment. In this case, an instruction to add dissimilar data to the learning data D2 is a message indicating that no abnormality has occurred in the production equipment even though the diagnosis unit 107 has determined that an abnormality has occurred in the production equipment. For example, an instruction to add dissimilar data to the learning data D2 may be input to the information processing apparatus 10 through an input operation by a user of the information processing apparatus 10. Alternatively, an instruction to add dissimilar data to the learning data D2 may be generated by another system that diagnoses abnormality of the production equipment and input to the information processing apparatus 10.

After dissimilar data are added to the learning data D2, the sampling error upper limit calculation unit 102 calculates the sampling error upper limit ε using the learning data D2 including the dissimilar data. In addition, the sample subsequence generation unit 103 generates the sample subsequences SS3 by using the learning data D2 including the dissimilarity data and the sampling error upper limit ε calculated using the learning data D2 including the dissimilarity data. Further, the statistical value calculation unit 104 performs a nearest neighbor search by using the sample subsequences SS3 generated using the learning data D2 including the dissimilar data and the trial data D4 to calculate the dissimilarity between the learning data D2 and the trial data D4 and statistical values of dissimilarity. The threshold calculation unit 106 calculates the threshold Th by using the sample subsequences SS3 generated using the learning data D2 including the dissimilarity data. The diagnosis unit 107 performs the diagnosis process using the learning data D2 including the dissimilarity data. Therefore, after the diagnostic target data D1 that should be diagnosed as normal are diagnosed as abnormal, the diagnostic target data D1 are added as dissimilar data, and such data are diagnosed as normal in the next and subsequent diagnosis processes.

As described above, according to the embodiment of the present invention, when similar learning subsequences selected from among a plurality of learning subsequences SS2 extracted from the learning data D2 are integrated to generate the sample subsequence SS3, the sampling error upper limit ε is calculated using input data that are time-series data. The sampling error upper limit ε is an upper limit on the dissimilarity between the learning subsequences SS2 to be integrated. Then, using the calculated sampling error upper limit ε, the sample subsequences SS3 are generated from the learning data D2. Therefore, a user of the information processing apparatus 10 can easily set an appropriate sampling error upper limit ε that keeps a balance between diagnostic accuracy and processing time merely by inputting time-series data without trial and error, and can easily generate appropriate sample subsequences SS3. Generating appropriate sample subsequences SS3 enables high-speed diagnosis processing while maintaining diagnostic accuracy.

The configurations described in the above-mentioned embodiment indicates examples of an aspect of the present invention. The configurations can be combined with another well-known technique, and part of the configurations can be omitted or changed in a range not departing from the gist of the present invention.

REFERENCE SIGNS LIST 10 information processing apparatus; 101 data acquisition unit; 102 sampling error upper limit calculation unit; 103 sample subsequence generation unit; 104 statistical value calculation unit; 105 storage unit; 106 threshold calculation unit; 107 diagnosis unit; D1 diagnostic target data; D2 learning data; D3 normal data; D4 trial data; SS1 diagnostic target subsequence; SS2 learning subsequence; SS3, SS3-1 sample subsequence; SS4 trial subsequence; CL cluster; ε sampling error upper limit; d distance; m, m_0 mean; σ, σ_0 standard deviation.

The invention claimed is:

1. An information processing apparatus comprising:
   data acquisition circuitry configured to acquire time-series input data for detecting a state of equipment;
   sampling error upper limit calculation circuitry configured to calculate, when similar learning subsequences selected from among a plurality of learning subsequences extracted from time-series learning data that are integrated to generate a sample subsequence, a sampling error upper limit using data taken from the time-series input data, the sampling error upper limit being an upper limit on dissimilarity between the selected similar learning subsequences to be integrated;
   sample subsequence generation circuitry configured to generate the sample subsequence from the time-series learning data using the sampling error upper limit; and
   diagnosis circuitry configured to determine that an abnormality occurs in the equipment based on the sample subsequence.

2. The information processing apparatus according to claim 1, wherein
   the time-series input data is data acquired from production equipment in operation.

3. The information processing apparatus according to claim 1, further comprising
   threshold calculation circuitry configured to calculate, using the sample subsequence, a threshold for diagnosing whether the time-series learning data includes a waveform similar to a waveform of diagnostic target data.

4. The information processing apparatus according to claim 3, wherein
   in response to accepting an instruction to add, to the time-series learning data, dissimilar data that is the diagnostic target data with respect to which the diagnosis circuitry determines that a waveform similar to a waveform of the diagnostic target data is not included in the time-series learning data, the data acquisition circuitry is further configured to add the dissimilar data to the time-series learning data.

5. The information processing apparatus according to claim 3, wherein
the time-series input data is sensor data for detecting a state of equipment, and
the diagnosis circuitry is further configured to determine that the abnormality occurs in the equipment if the time-series learning data does not include a waveform similar to a waveform of the diagnostic target data.

6. The information processing apparatus according to claim 5, wherein
if the data acquisition circuitry accepts a message indicating that no abnormality occurs in the equipment even though the diagnosis circuitry determines that the abnormality occurs in the equipment, the data acquisition circuitry adds, to the learning data, dissimilar data that is the diagnostic target data from which the abnormality is detected.

7. The information processing apparatus according to claim 1, wherein
the data acquisition circuitry is further configured to divide the time-series input data to generate the time-series learning data and trial data, and
the sampling error upper limit calculation circuitry is further configured to calculate the sampling error upper limit on a basis of a dissimilarity between the trial data and the time-series learning data.

8. The information processing apparatus according to claim 7, wherein
the sampling error upper limit calculation circuitry is further configured to calculate the sampling error upper limit on a basis of a statistical value of the dissimilarity between the trial data and the time-series learning data, and the sampling error upper limit is obtained by multiplying, by a positive real number, a sum of a mean of the dissimilarity between the trial data and the time-series learning data and a positive real multiple of a standard deviation of the dissimilarity between the trial data and the time-series learning data.

9. The information processing apparatus according to claim 7, wherein
the sampling error upper limit calculation circuitry is further configured to calculate the sampling error upper limit using a statistical value of the dissimilarity between the trial data and the time-series learning data and a predetermined calculation formula.

10. The information processing apparatus according to claim 9, wherein
the calculation formula indicates that the sampling error upper limit is obtained by multiplying, by a positive real number, a sum of a mean of the dissimilarity between the trial data and the time-series learning data and a positive real multiple of a standard deviation of the dissimilarity between the trial data and the time-series learning data.

11. The information processing apparatus according to claim 9, wherein
the dissimilarity between the trial data and the time-series learning data is computed in association with each of trial subsequences that are subsequences extracted from the trial data, and
the dissimilarity corresponding to each of the trial subsequences is a minimum dissimilarity between the trial subsequences and learning subsequences that are a plurality of subsequences extracted from the learning data while shifting an extraction range.

12. An information processing method to be executed by an information processing apparatus, the method comprising:
acquiring time-series input data for detecting a state of equipment;
calculating, when similar learning subsequences selected from among a plurality of learning subsequences extracted from time-series learning data are integrated to generate a sample subsequence, a sampling error upper limit using the time-series input data, the sampling error upper limit being an upper limit on dissimilarity between the selected similar learning subsequences to be integrated;
generating the sample subsequence from the time-series learning data using the sampling error upper limit: and
diagnosing that an abnormality occurs in the equipment based on the sample subsequence.

13. The information processing method according to claim 12, further comprising
calculating, using the sample subsequence, a threshold for diagnosing whether the time-series learning data includes a waveform similar to a waveform of diagnostic target data.

14. The information processing method according to claim 13, wherein
the time-series input data is sensor data for detecting a state of equipment, and the method further comprises determining that the abnormality occurs in the equipment if the time-series learning data does not include a waveform similar to a waveform of the diagnostic target data.

15. The information processing apparatus according to claim 14, further comprising
adding, to the learning data, dissimilar data that is the diagnostic target data from which the abnormality is detected, if a message is accepted indicating that no abnormality occurs in the equipment even if the method determines that the abnormality occurs in the equipment.

* * * * *